Dec. 4, 1934.  M. J. WEBER  1,982,938
SCALE
Filed June 27, 1929   6 Sheets-Sheet 1
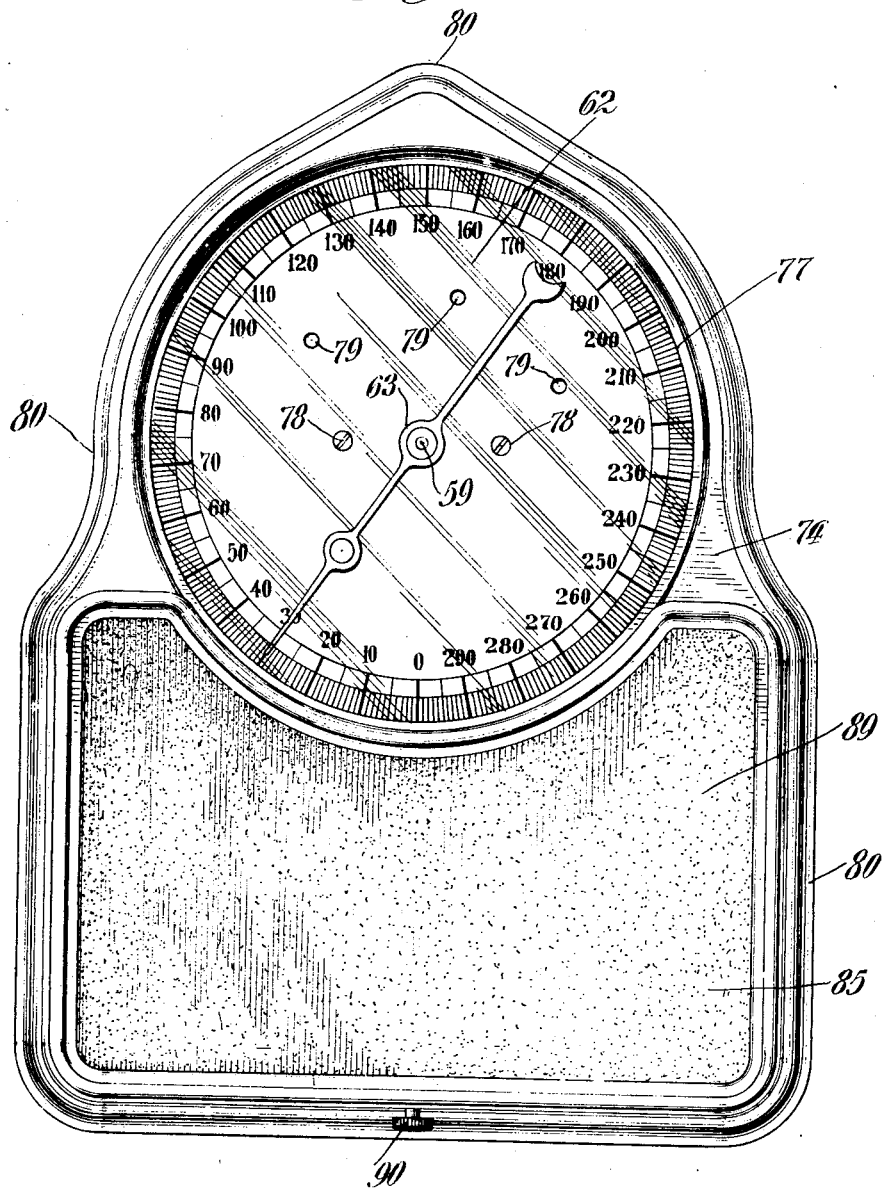

Dec. 4, 1934.　　　M. J. WEBER　　　1,982,938
SCALE
Filed June 27, 1929　　6 Sheets-Sheet 2
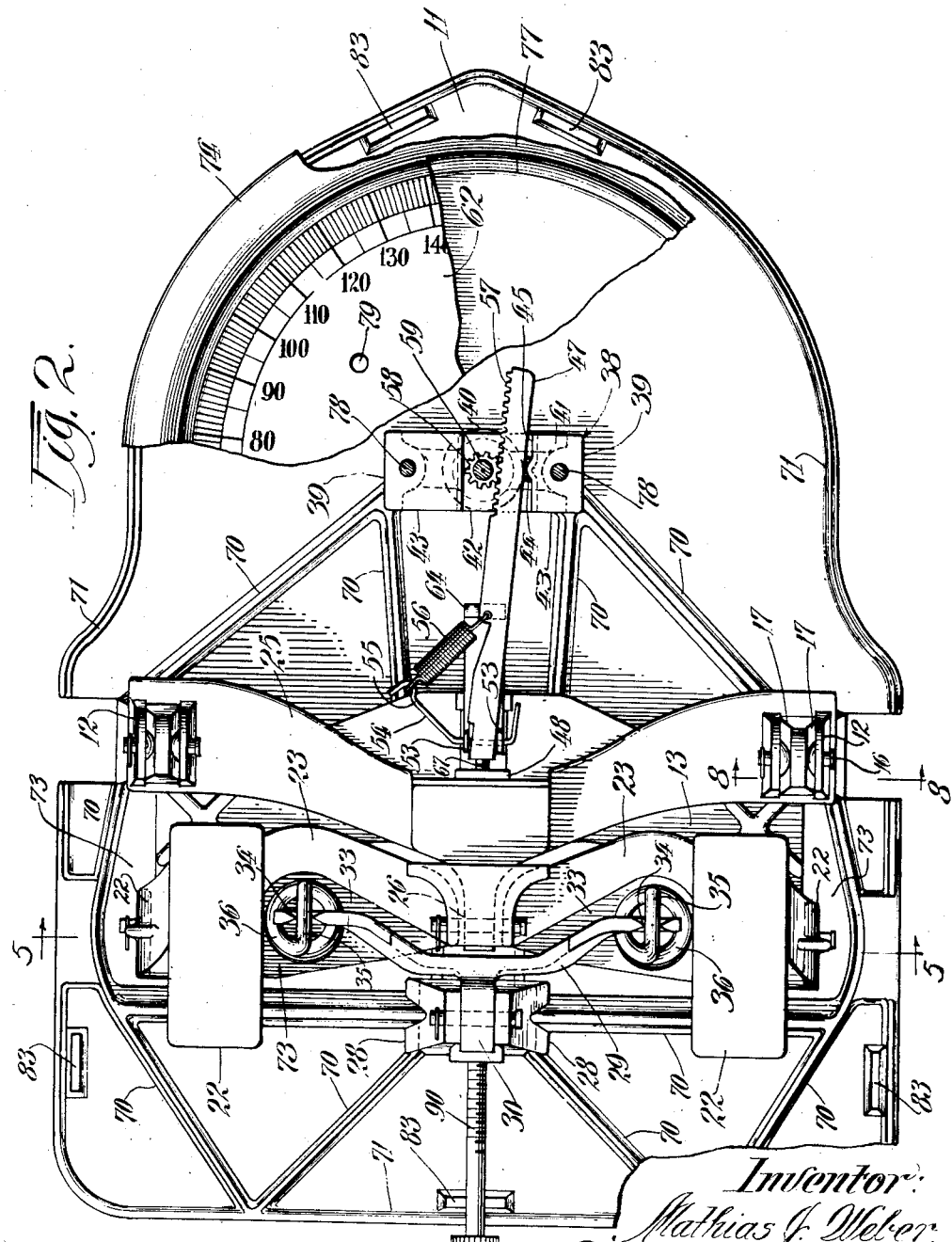

Dec. 4, 1934.　　　M. J. WEBER　　　1,982,938
SCALE
Filed June 27, 1929　　6 Sheets-Sheet 3
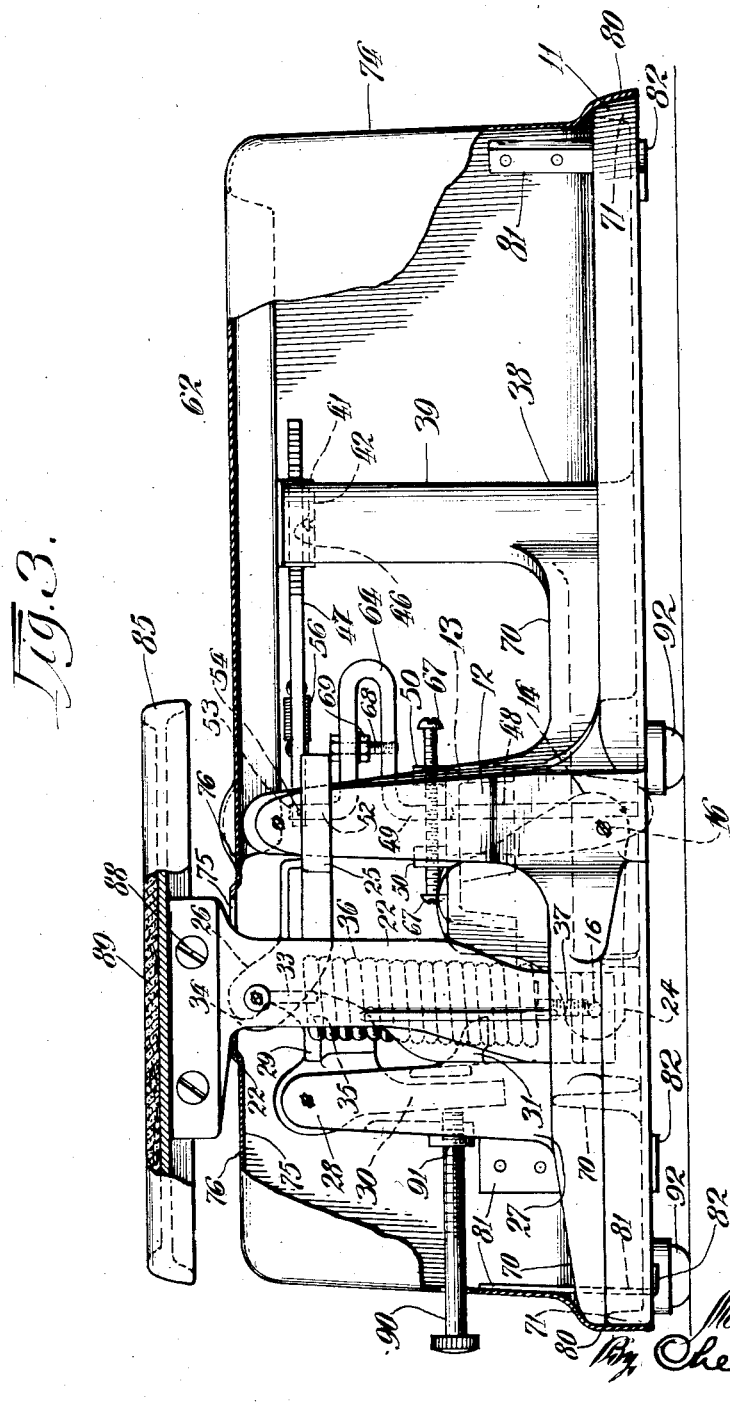

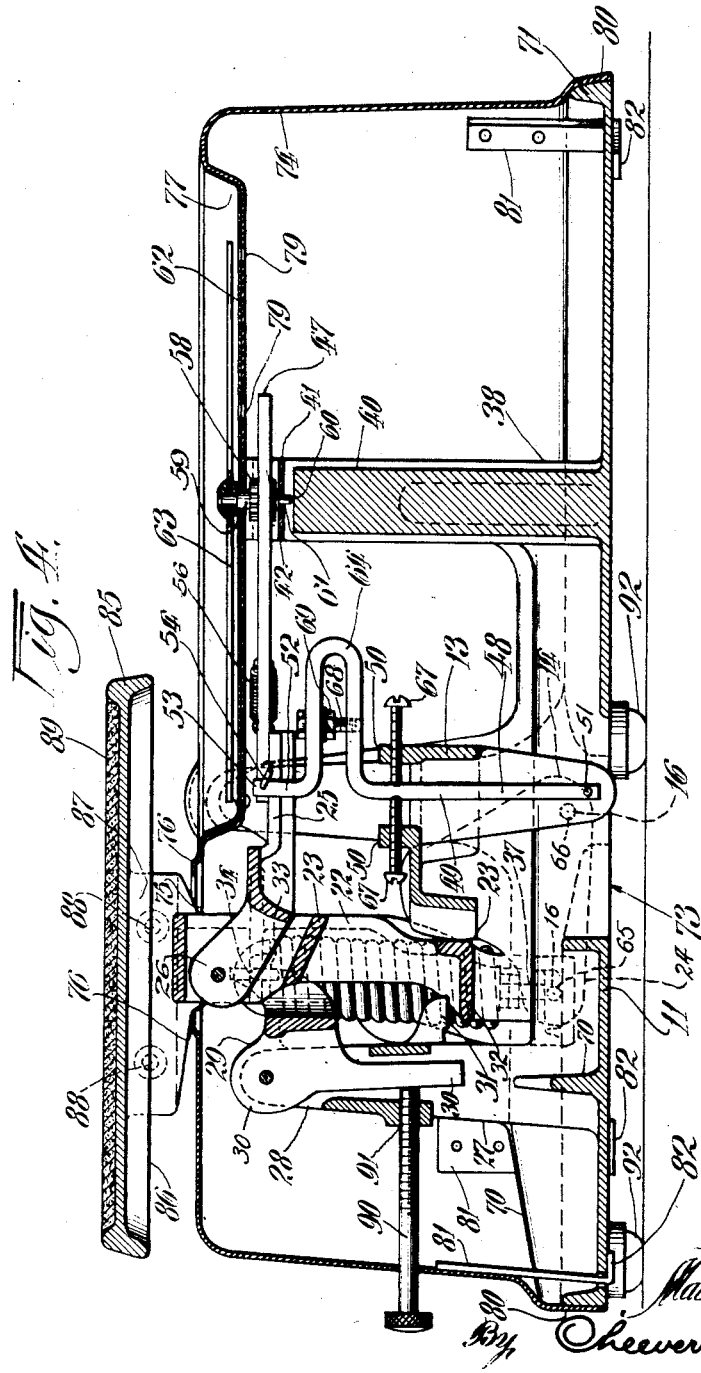

Dec. 4, 1934.　　　　M. J. WEBER　　　　1,982,938
SCALE
Filed June 27, 1929　　　6 Sheets-Sheet 5
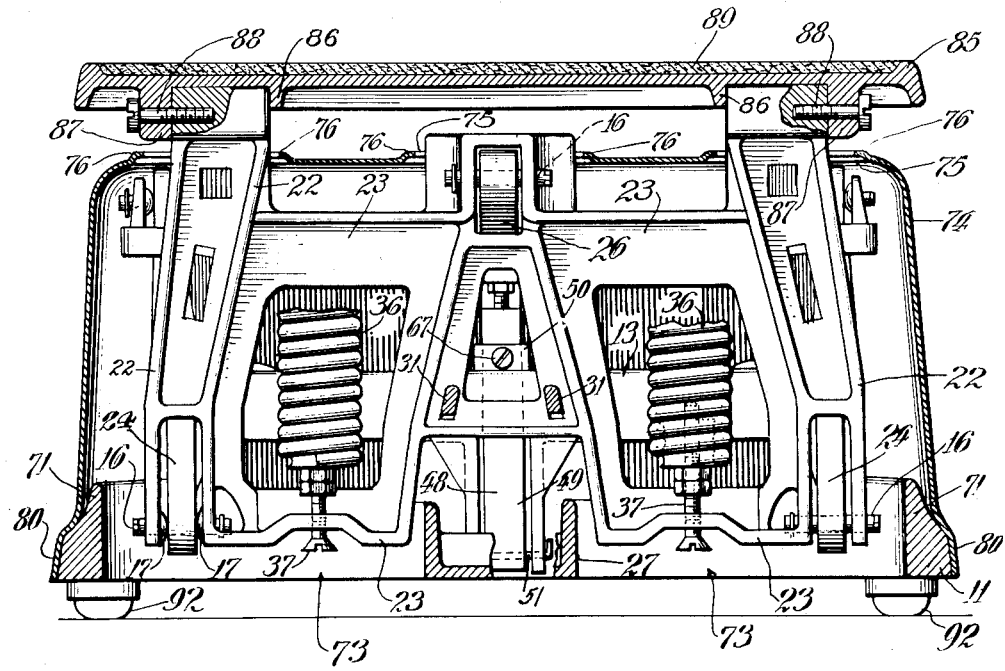

Dec. 4, 1934.　　　　M. J. WEBER　　　　1,982,938
SCALE
Filed June 27, 1929　　　6 Sheets-Sheet 6
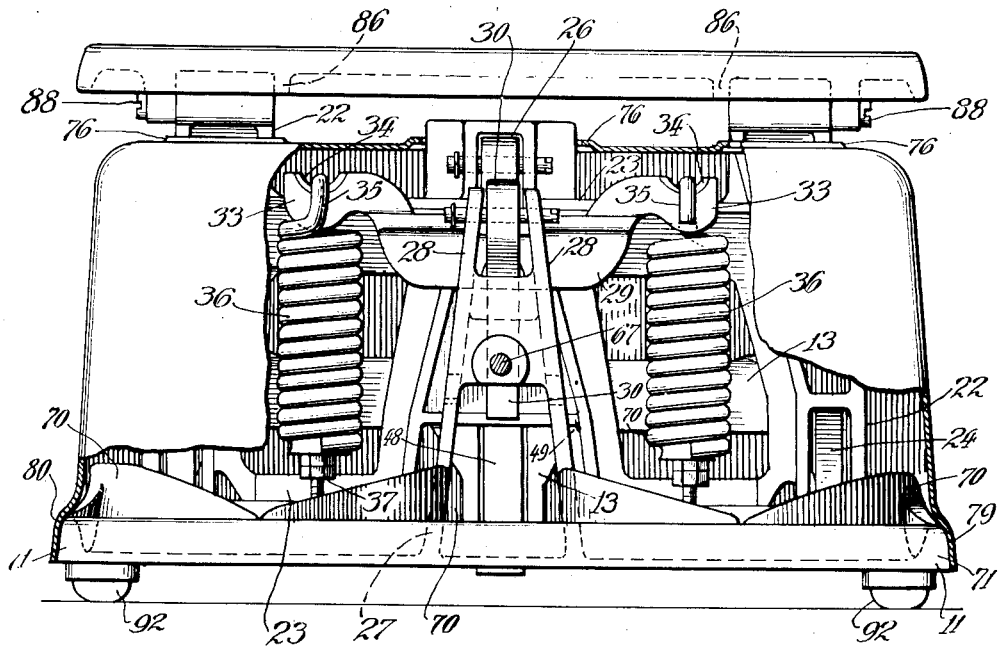
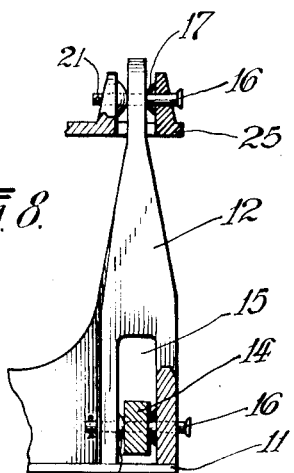
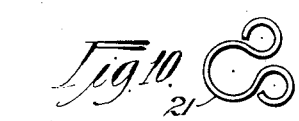
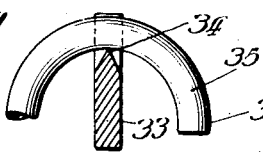
Inventor:
Mathias J. Weber,
By Cheever, Cox & Moore
Attorneys.

Patented Dec. 4, 1934

1,982,938

UNITED STATES PATENT OFFICE 1,982,938

SCALE

Mathias J. Weber, Chicago, Ill., assignor, by mesne assignments, to Continental Scale Works, Chicago, Ill., a corporation of Illinois Application June 27, 1929, Serial No. 374,056

12 Claims. (Cl. 265—68)

This invention relates to scales in general and particularly to that type of scale which is constructed relatively close to the floor.

The primary object of the invention is to provide a scale which is compact and low so that it can be easily stepped onto and off.

Another object is to provide a scale which can be readily assembled, which can be easily adjusted after it is assembled, which is efficient, and which can be readily and economically manufactured.

Another object is to provide a scale which is strong and rigid, which is provided with means for accurately adjusting the scale mechanism so that it will register correctly, and which is provided with novel means for setting the dial indicator.

Another object is to provide a scale having a base, which has a plurality of upstanding supports integral therewith, and which has a plurality of webs connected to the standards and other parts of the base to reinforce the base.

Another object is to provide a scale which is provided with a removable shell, which surrounds the scale mechanism and is fastened to the base to conceal all the scale mechanism.

Another object is to provide a one-piece drawn shell which is applied to the scale after the mechanism is assembled, which is provided with openings to receive the platform supports and which is provided with a depression to receive a dial. The top of this shell is provided with an upturned portion about these openings to prevent any objects which may be left on the scale or any water which may be spilled thereon from entering the scale mechanism.

Another object of my invention is to adjust the length of at least one of the levers in order to compensate for inaccuracy of the resilient means against which the weight is measured, and/or transfer mechanism connecting the weighing mechanism with the indicator.

Another object of my invention is to provide means to adjust the length and angularity of one of the levers in order to calibrate the indicator against the spring mechanism associated with the movable platform.

Another object of my invention is to provide a simple, inexpensive mounting for the indicator shaft utilizing a scale dial housing as a bearing for the indicator shaft.

A still further object is to provide new and novel means for securely holding the parts together, and which will reduce friction between the members, as well as take up excess play or movement between the parts.

Another object is to provide a scale having a base which is provided with openings therethrough to permit part of the operating mechanism to extend down into the base when the maximum load is being carried by the scale and thereby render the scale more compact. The openings in the base also permit minor adjustments to be made in the mechanism and these openings are covered by a removable plate.

Another object is to provide a combination of parts and elements which are located and arranged in a particular position to make the scale compact and low, to reduce friction, and which is provided with means for maintaining the parts in proper operative position.

Other objects and advantages will appear through the progress of the specification.

The invention comprises in general a base having a plurality of upstanding supports. A cross beam is pivoted to a pair of these supports and a cross head is pivotally connected to the top of this same pair of supports. A cross member having a pair of upstanding platform supports is pivoted to this cross beam at the bottom thereof, and a lug integral with the cross head is pivoted to a cross arm which connects the platform supports near their upper ends. A yoke is pivoted to a rearwardly upstanding support which is integral with the base, and this yoke carries springs which are fastened at their lower ends to the lower arm which connects the platform supports. A rack is operatively connected to the cross beam and operates the indicator. New and improved means are provided for adjusting the mechanism so that it will weigh accurately, and means are also provided for correctly setting the dial indicator.

The accompanying drawings illustrate a selected embodiment of the invention and the views therein are as follows:

Fig. 1 is a top plan view of the improved scale.

Fig. 2 is a detail plan section.

Fig. 3 is a detail elevation partly in section showing the scale mechanism.

Fig. 4 is a detail sectional view taken substantially on the longitudinal center line of the scale.

Fig. 5 is a sectional view taken substantially along the line 5—5 in Fig. 2.

Fig. 6 is a diagrammatic view showing the manner in which the parts operate.

Fig. 7 is a detail elevation, parts being broken away for the sake of clearness.

Fig. 8 is a detail sectional view on the line 8—8 of Fig. 2.

Fig. 9 is a detail perspective view of a bearing pin.

Fig. 10 is a detail plan view of an eyelet or locking ring used in connection with the bearing pin.

Fig. 11 is a detail sectional view showing the manner in which the springs are supported on the yoke.

The scale shown in the drawings has a base 11 which is provided with a pair of spaced uprights 12, which are preferably cast integral with the base 11. A tilting member or cross beam 13 is provided with lugs 14 which extend into a slot or opening 15 in each of the uprights 12. Bearing pins 16 extend through alined openings in the uprights and the lugs 14 to pivotally support the cross beam 13. Conical washers 17, Fig. 8, having rounded inclined surfaces are received by the bearing pin 16 and are arranged in the space between the lug and the side of the uprights to prevent side play of these members, Fig. 2.

The bearing pin 16, Fig. 9, has one end flattened at 19, and its other end is provided with an annular groove 20 which receives a locking ring 21, Fig. 10. This locking ring may be the conventional eyelet, such as is used on women's apparel.

Vertical platform supports 22 are connected by cross arms 23 and are slotted at their lower ends to receive the rearwardly extending lugs 24 on the cross beam 13. Bearing pins 16 pass through alined holes in the platform supports 22 and the lugs 24. Washers 17 are also provided on each side of the lug to take up side play between these two members. A cross head 25 is pivotally mounted to the tops of the uprights 12 and it has a rearwardly extending lug 26, which is received in a slot in the top cross arm 23. A bearing pin passes through alined holes in this upper cross arm, and the lug 26 pivotally connects the cross head to the top cross arm 23. A standard 27 which is preferably made integral with the base 11 has a pair of upwardly inclined legs 28. A yoke 29 has a rearwardly extending arm 30 which is arranged between the legs 28 and pivoted thereto, Figs. 2 and 7. Forwardly extending lugs 31 are provided on the legs 28 and are adapted for engagement with the upwardly extending portion 32 of the bottom cross arm 23, Fig. 4. The side arms 33 of the yoke 29 have a knife edge 34 at their outer ends and receive the top loop 35 of the springs 36, which are also connected to the bottom cross arm 23 and held in position thereon by the screw member 37. An upstanding member 38 integral with the base 11 has a pair of spaced arms 39 and a central spindle 40, and supports a saddle 41.

The saddle 41 has a lower portion 42, which is spaced from the top of the spindle 40, and it has side arms 43 which are supported by the spaced arms 39. A protuberance 44 is provided on one vertical edge 45 of the saddle 41 and a protuberance 46 is provided on the lower portion 42 of the saddle to form bearing surfaces for the rack 47.

An angularly adjustable lever arm 48 is carried by the tilting member or cross beam 13 with its lower portion 49 arranged between the upper transverse lugs 50, the lower portion of the lever 48 being pivoted on the cross-beam 13 by means of a pin 51 mounted in the cross-beam. The upper end 52 of the lever 48 is provided with a pair of upstanding legs 53, between which the rear end of the rack 47 extends. A pivot pin 54 extends through the legs 53 and the rearward end of the rack 47 and pivotally connects the rack to the lever 48. This pivot pin has an outwardly extending curved end 55, Fig. 2, and receives one end of a spring 56. This spring is also connected to the rack and pulls the forward end of the rack 47 toward the top of the sheet, as shown in Fig. 2, to keep the rack teeth 57 in engagement with the pinion 58 on the dial pin 59. A downwardly extending pin 60 on the pinion 58 extends through a hole 61 in the saddle 41 and rests upon the top of the central spindle 40, which provides a bearing for the dial pin 59. The dial pin 59 extends through a graduated dial 62 and has an indicator 63 for reading the calibrations on the dial 62.

The lever 48 is bent forwardly and returned between its ends to provide a U-shaped portion 64 to permit adjustments to be made in the effective length of the lever 48 so that the scale will weigh accurately. When weight is applied to the platform supports 22, the cross beam 13 will pivot at the points 65 and 66, as shown diagrammatically in Fig. 6, and cause the cross beam to swing the lever 48, which is adjustably fixed thereon, toward the left. When weight is applied to the platform supports the lever 48 will swing to the left, and to the right when the weight is removed. The angle of the lever 48 relative to its fulcrum 65 changes during the movement of this lever. This change of angle and the friction on the various pivot points may cause the scale to weigh incorrectly at various or repeated intervals. Screws 67 are provided to change the angle and correct for these inaccuracies. A set screw 68 is arranged in the U-shaped portion 64 of the lever and is operated to move the top of the lever upwardly or downwardly, and thereby increase or decrease the length of this lever. The operation of the set screw 68 changes the sweep of the lever 48 so that it travels in a smaller arc. This adjustment also permits discrepancies and inaccuracies to be overcome and compensated. A nut 69 is arranged on the set screw 68 to lock it in adjusted position.

The base 11 is provided with a plurality of ribs 70 which are connected to the uprights 12, the legs 28 of the standard 27 and the upstanding member 38. Some of these ribs also integrally connect with an upstanding peripheral flange 71 on the base. The base also is provided with a plurality of openings 73 which permit the platform supports 22 to extend through the base substantially to the floor when the maximum load is carried by the platform supports.

A one-piece drawn shell 74 fits over the assembled mechanism and is provided with openings 75 in the top, through which the platform supports 22 and the top of the upwardly extending legs 28 protrude. An upturned integral portion 76 is provided around the openings 75 to prevent objects and water from entering these holes and getting into the scale mechanism. A circular depression 77 is provided in the top of this shell and receives the dial 62 which is held in place by the screws 78 which have threaded engagement with the arms 39 of the upstanding member 38. Holes 79 may be provided in the dial so that any water which may be spilled onto the dial will flow through these holes 79 and pass out through openings provided in the base. The bottom of the shell is drawn outwardly to provide a beaded edge 80 which fits over and receives the upstanding peripheral flange 71. Sheet metal downwardly extending lugs 81 having a lip 82 are welded to the inside of the shell. These lugs extend through holes or slots 83 in the base and are crimped over against the bottom of the base and securely hold the shell in position on the base. The one-piece shell may be enameled or otherwise decorated and then fitted on the comparatively rough casting scale mechanism and base which provides a neat appearing and finished scale. A removable plate (not shown) is fastened to the bottom of the base and covers the openings 75.

After the mechanism is assembled and the shell is fastened in position on the base, a platform 85 is fastened to the platform uprights 22. The underside of this platform is provided with webs 86 to strengthen it and receive the upper parts of the platform supports. A downwardly extending lug 87 is provided in the bottom of the platform and screws 88 pass through the lug 87 and threadedly engage the side of the platform supports for holding the platform in operable position on the supports.

The top of the platform is depressed to receive a pad 89 which may be made of some composition, such as cork, linoleum, or the like. This construction of the support makes a smooth and neat appearing surface without any protruding screws or other fastening members.

A set screw 90 passes through the front of the shell and operates in a threaded opening 91 in the standard 27. When this screw is operated, its forward end will contact with the arm 30 of the yoke and move this arm rearwardly, which will swing the side arms 33 of the yoke which causes slight movement of the platform supports and the cross beam 13, and which in turn moves the rack 47 and permits the indicator 63 to be set at zero. Rubber feet 92 may be fastened to the base, as clearly shown in the drawings.

In addition to the zero-setting mechanism, my invention provides means for varying the distance traveled by the rack 47, and hence by the indicator, in response to the displacement of the platform under the influence of an applied weight and for compensating the gain and loss effect developed in the indicator during its operation throughout the limits of its deflection.

I prefer to mount the means for performing these additional adjustments on the tiltable member or bell crank lever 13 and to dispose the same in the operative connections between the platform 22 and the indicating means 63.

In the preferred form, the deflection or indicator movement adjustment is accomplished by the provision of a set screw 68 by which the length of the lever arm 49 is controlled. By adjusting the length of the arm 49, the total distance traveled by the rack 47 and hence by the indicator in response to displacement of the platform may be varied.

The gain and loss adjustment is accomplished by means of the set screws 67, which contemplate the adjustment of the relative angular position of the arm 49, with respect to the member 13 on which it is carried. In this connection, it will be seen that the end of the arm 49, which is connected with the rack, and one end of the rack will travel a circular arc, the center of which is located at the pivot 66. When there is no weight upon the platform, the arm 49 will be in a position to the right of that illustrated in Figures 3, 4, and 6, the arm, making with the rack, an angle greater than a right angle so that the vertical distance between the pivot 66 and the rack 47 will be less than the distance between the pivots 54 and 66. As weight is applied to the platform, the arm 49, will swing in a counter-clockwise direction, viewing Figures 3, 4, and 6, until the arm 49 makes a right angle with the rack 47, which is the position shown in Figures 3, 4, and 6. When the parts are in this position, the vertical distance between the pivot 66 and the rack will be equal to the length of the arm 49 between the pivots 54 and 66. During the initial interval of movement, it will be seen that the vertical distance between the pivot 66 and the rack has been increasing and this causes the indicator to gain, that is to say, to gradually introduce an error in the weight indication so that the indicated weight is slightly greater than the true weight of the object on the platform.

If the weight of the object on the platform is sufficient to swing the arm 49 to the left of the position illustrated in Figure 3, the vertical distance between the pivot 66 and the rack will gradually decrease as the angle made by the arm 49 with the rack varies from a right angle. The indicator consequently will gradually lose and this loss will eventually offset the gain developed during the initial movement of the mechanism prior to the point at which the arm 49 makes a right angle with the rack. In order to minimize the error introduced at the indicator, due to this gain and loss, it is desirable to adjust the mechanism so that the arm 49 assumes a position making a right angle with the rack, as shown in Figures 3, 4, and 6, when the indicator is substantially at mid-scale deflection and to cause the indicator, at its initial and final deflection, to indicate a weight less than the true applied weight by an amount equal to the difference between the weight indicated at mid-scale deflection higher than the true weight. This is accomplished by providing for the adjustment of the relative angularity of the arm 49 with respect to the member 13, and I prefer to designate this as the gain and loss adjustment.

The invention provides a scale which is considerably lower than any scale heretofore known, and which is very compact and easily assembled. The dial which may be enameled will not require the usual glass top to shed water, but any water which may be spilled on the dial will drop through onto the base and then drain off without getting into any of the operating mechanism. The rounded inclined washers prevent side play and are inexpensively manufactured. The webs on the base increase the strength of the base for supporting the operating mechanism, and the cross head, the cross beam, and the yoke are made curved so that they fit close together to make a very compact structure. The device can be adjusted to make the scale weigh correctly and then the front adjustment is operated to keep the indicator in position so that it indicates the correct poundage. The one-piece drawn shell is inexpensive to make and is easily and quickly fastened to the base in a novel manner, and it may be finished by enameling or lacquering so that when the rough operating mechanism is assembled, the scale will provide a neat appearance. The pivot points 65 and 66 and the point where the cross head is pivoted to the uprights and the point where the yoke is pivoted to the standard comprise substantially a parallelogram and transmits the movement of the platform uprights to the rack which operates the indicator pinion.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A scale comprising a base, a weighing mechanism carried by said base and comprising an indicator, a weighing platform, means for actuating said indicator in response to the deposition of an object to be weighed on said platform, comprising a swingable member operatively connected to said platform for movement in response to the shifting of the platform under the influence of the weight of the object deposited thereon, a lever mounted on the swingable member to swing therewith, means to adjust the relative angularity of the lever on the swingable member, and means forming an operative connection between the lever and the indicator for the purpose of actuating the latter, and means for adjusting the length of the lever.

2. A scale comprising a base, a weighing mechanism carried by said base and comprising an indicator, a weighing platform, means for actuating said indicator in response to the deposition of an object to be weighed on said platform, comprising a swingable member operatively connected to said platform for movement in response to the shifting of the platform under the influence of the weight of the object deposited thereon, a lever adjustably mounted on the swingable member to swing therewith, means forming an operative connection between the lever and the indicator, and means for varying the length of the lever between its point of attachment on the swingable member and its point of attachment in the operative connection for actuating the indicator.

3. A scale comprising a base, weighing mechanism on said base including a weighing platform shiftable on the base in response to the deposition of a weight on the platform, and spring means for counterbalancing the weight on said platform, a member mounted on said base and operating in an arc when said spring means is extended by the weight on said platform, a lever carried by said member and movable therewith, weight-indicating means operated by said lever, means for lengthening said lever to compensate for inaccuracies of said spring means, and means for varying the position of said lever relative to said last-named member to change the arc in which said lever moves to further compensate for inaccuracies of said spring means.

4. A scale comprising a pivoted cross beam, a lever connected to said cross beam, an indicator, means connecting said indicator and lever, mechanism controlled by a weight for moving said cross beam, means for regulating the length of said lever and thereby providing an adjustment for the indicator, and means for changing the arc in which said lever moves to provide further adjustment of said indicator.

5. A scale comprising a base, a shiftable platform and a weight indicator on said base, yielding means operatively associated between the platform and said base to resist movement of the platform in response to the weight of an object on the platform, mechanism interconnecting said platform and indicator and comprising a lever member pivotally mounted on the base, a connecting member angularly movable on the lever member, means connecting one of said members with the indicator and the other member with the platform, and means comprising a pair of set screws threadedly carried by one of said members and adjustable thereon and arranged to bear upon the other member and urge it in opposite directions when tightened whereby to adjust the relative angular relationship of the members.

6. A scale comprising a base, a shiftable platform and a weight indicator on said base, yielding means operatively associated between the platform and said base to resist movement of the platform in response to the weight of an object on the platform, mechanism interconnecting said platform and indicator comprising a lever member pivotally mounted on the base and operatively connected with the platform, a connecting member angularly movable with respect to the lever member and operatively connected with the indicator, and means comprising a pair of set screws threadedly carried by one of said members and adjustable thereon and arranged to bear upon the other member and urge it in opposite directions when tightened whereby to adjust the relatively angular relationship of the members.

7. A scale comprising a base, a shiftable platform and a weight indicator on said base, yielding means operatively associated between the platform and said base to resist movement of the platform in response to the weight of an object on the platform, mechanism interconnecting said platform and indicator comprising a lever member pivotally mounted on the base, a connecting member angularly movable with respect to the lever member, means connecting one of said members with the indicator and the other with the platform, and means comprising a pair of set screws threadedly carried by said lever member and adjustable thereon and positioned to bear upon the connecting member and urge it in opposite directions when tightened whereby to adjust the relative angular relationship of the members.

8. A scale comprising a base, and weighing mechanism on said base comprising a shiftable platform, a weight indicator, means interconnecting the platform and indicator to operate the latter in response to the deposition of a weight on the former, said means comprising an indicator driving element connected to drive said indicator and having an arcuately movable portion whereby a gain and loss effect is developed in the indicator during the operation of the scale, a tilting device having an arm drivingly connected to the platform and an arm connected to the arcuately movable portion of the driving element, means to set the indicator to zero, and means to adjust the relative angularity of said arms of the tilting device in order to change the gain and loss effect developed in the indicator when the scale is in operation.

9. A scale comprising a base and weighing mechanism on said base and comprising a shiftable platform, a weight indicator, connecting means interconnecting the platform and indicator whereby to operate the latter in response to the deposition of a weight on the former, yielding means against which the mechanism operates, and means cooperatively associated with said mechanism for adjusting the indicator for zero-setting purposes, said connecting means comprising an indicator driving element drivingly connected to said indicator and having an arcuately movable portion whereby a gain and loss effect is developed in the indicator during the operation of the scale, a tilting device having an arm drivingly connected to the platform and an arm connected to the arcuately movable portion of the driving element, and means to adjust the relative angularity of said arms to change the gain and loss effect developed in the indicator while the scale is in operation.

10. A scale comprising a base, a shiftable platform, a weight indicator, mechanism interconnecting the platform and indicator whereby to operate the latter in response to the deposition of a weight on the former and comprising an indicator driving element having an arcuately movable portion whereby a gain and loss effect is developed in the indicator during the operation of the scale, a tilting device having an arm drivingly connected to the platform and an arm connected to the arcuately movable portion of the driving element, said tilting device being adjustable in effective length to regulate the deflection of the indicator in proportion to applied weight on the platform and being further angularly adjustable to position the point of least gain and loss effects developed in the indicator means to average anticipated load.

11. A scale comprising a base, a shiftable platform, weight-indicating means, and devices operatively connecting the shiftable platform with the weight indicating means including a tiltable member and a member having a portion movable in an arcuate path and hence subjecting the weight-indicating means to gain and loss effects, said tiltable member having an arm adjustable in effective length for regulating the deflection of the indicating means in proportion to applied weight on the platform and being further angularly adjustable to position the point of least gain and loss effects developed in the indicating means to average anticipated load.

12. A scale comprising a base, a shiftable platform, weight-indicating means, and devices operatively connecting the shiftable platform with the weight-indicating means including a tiltable member, and a member having a portion movable in an arcuate path and hence subjecting the weight-indicating means to gain and loss effects, means mounted on said member and adjustable in effective length for regulating the deflection of the indicating means in proportion to applied weight on the platform, and means carried by said member and angularly adjustable thereon to position the point of least gain and loss effects developed in the indicating means to average anticipated load.

MATHIAS J. WEBER.